April 18, 1967  V. H. NEUBERT  3,314,503
VIBRATION DAMPER
Filed Aug. 31, 1965

*INVENTOR.*
VERNON H. NEUBERT
BY V. C. MULLER
ATTORNEY.

United States Patent Office 3,314,503
Patented Apr. 18, 1967

3,314,503
VIBRATION DAMPER
Vernon H. Neubert, Centre Hall, Pa., assignor, by mesne assignments, to the United States of America as represented by the Secretary of the Navy
Filed Aug. 31, 1965, Ser. No. 484,138
6 Claims. (Cl. 188—1)

This invention relates to improvements in vibration dampers for use with vibrating elongated members, such as pipes, rods and the like.

It has long been recognized that objectionable vibrations in elongated members may be damped or attenuated by the use of weights which are resiliently secured to the vibrating member. Such vibrations may be of several types, such as axial, torsional, lateral in a single direction, or lateral in two or more directions, or any combination of such types. Prior art devices have generally been designed to damp vibrations in only a single direction in which the principal vibration occurs. Thus, in dampers for power transmission lines suspended from towers and subject to vibration induced by wind, the vibration is in a vertical direction and weights are resiliently attached to the line for damping only in such directions. Patent 1,675,391 is exemplary of this type of damper. Similarly, in dampers for engines, the vibrtaion is principally torsional. In buildings and ships the vibrations are usually more complex, being in several directions; however, dampers for this purpose are specially designed for the considerable masses involved.

In certain installations of elongated members all of the various types of vibrations may simultaneously occur and, as will be aparent, it would be exceedingly cumbersome to employ several different types of dampers, each effective to damp only one type of vibration. Thus, in ships, submarines and torpedoes which employ fluid conduits, either gaseous or hydraulic, such conduits may vibrate in the several directions referred to as a result of fluctuating fluid flow or other exciting forces applied to the conduit supports.

One of the objects of this invention is to provide a unitary damping device which serves to damp lateral, torsional and axial vibrations which are imparted to an elongated member.

Another object is to provide individual adjustments which serve to damp the several types of vibrations.

A further object is to provide a damper which may be readily attached to an elongated member at any point between its supports.

Still further objects, advantages and salient features will become apparent from the description to follow, the appended claims, and the accompanying drawing in which:

Figure 1:
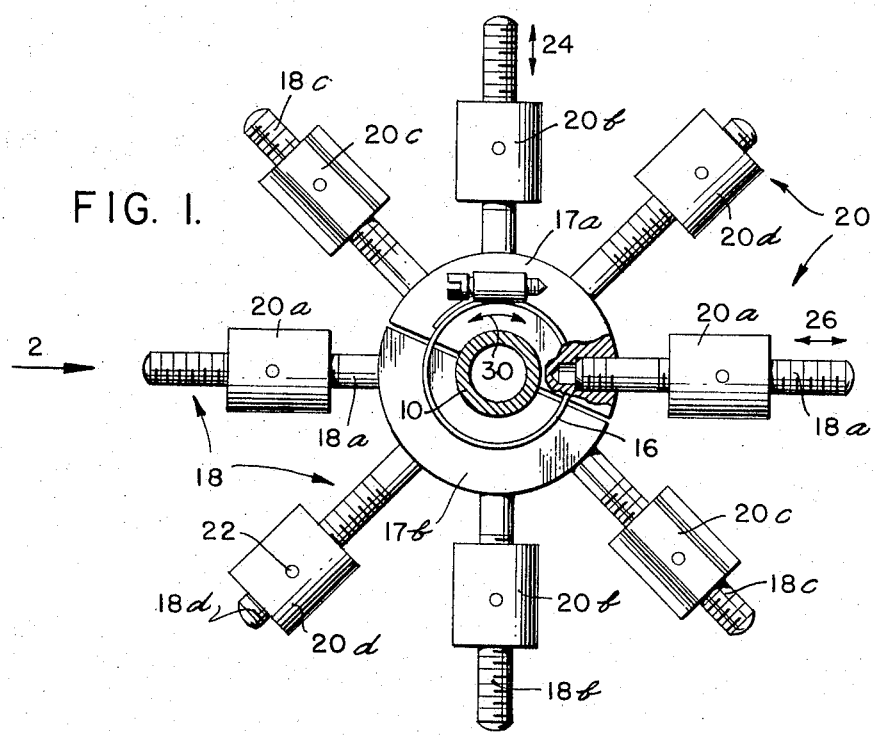
FIG. 1 is a cross section taken on line 1—1, FIG. 2.
Figure 2:
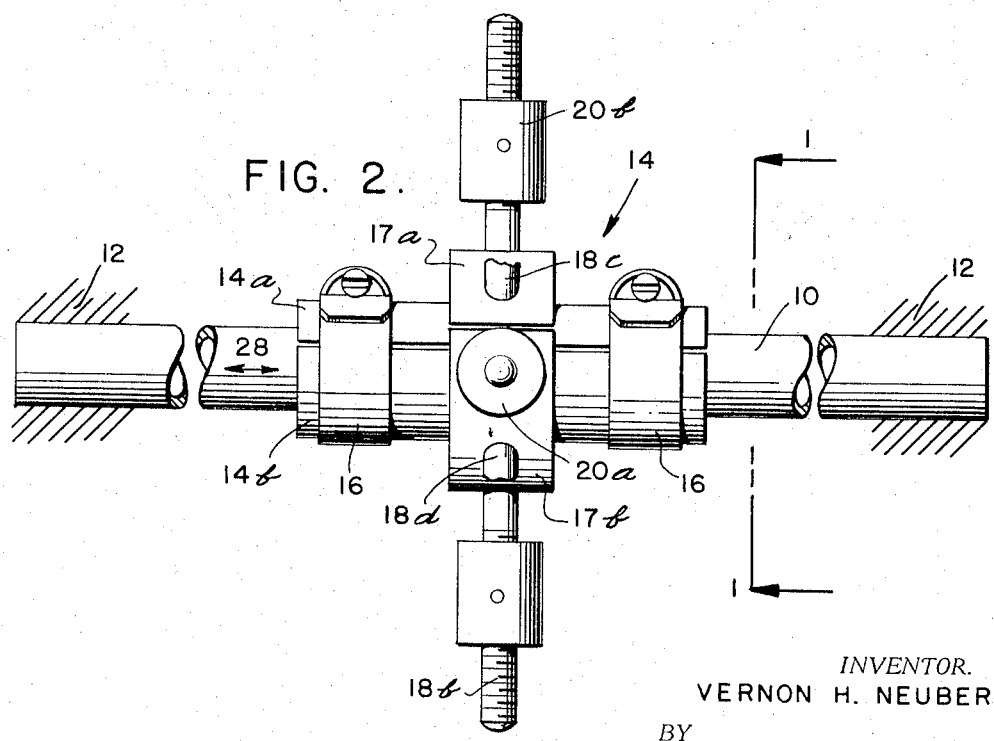
FIG. 2 is a side elevation of FIG. 1 in the direction of arrow 2, portions being broken away.

Referring now to the drawing, member 10 may be a pipe or rod of any desired length secured to supports 12, 12. If a rod, it will be assumed the supports are vibrating in such manner as to impart the several types of vibration referred to. If a pipe, the same may be assumed with the further assumption that fluid passing through the pipe may induce part or all of such vibrations. Thus, in the more complex combination of vibrations the rod or pipe will be assumed to be vibrating axially, torsionally, and laterally in two directions in a plane transverse to its longitudinal axis. The lateral vibration, particularly, will be further assumed to be in wave form, having nodes at only the supports, if vibrating at a fundamental frequency, or in addition, one or more nodes between the supports if a harmonic vibration is present.

The subject of the invention comprises a diametrically split hub 14 formed of like parts 14a, 14b which are secured to member 10 by contractible clamps 16, 16, such as of the conventional type employed for securing hoses to their connecting conduits. Intermediate its ends the hub is provided with integral half-collars 17a, 17b which threadedly receive a plurality of resilient studs 18, each of which is provided with a weight 20 which threadedly engages a stud and may be adjusted to a desired radial position and secured by a set screw 22 or other desired locking means such as a check nut.

In the operation of the apparatus, it will first be assumed that member 10 is subjected to a lateral vibration in the direction of double arrow 24, perpendicular to the axis of aligned springs 18a, 18a and with a known frequency. Weights 20a, 20a are adjusted along their respective springs 18a, 18a, to positions such that their natural frequency is tuned to the frequency of member 10. They will then be vibrating out of phase with the vibration of member 10 and producing a damping force as well understood in the art. Let it next be assumed that member 10 is also vibrating in the direction of double arrow 26. Weights 20b, 20b are adjusted in like manner to damp this vibration. Next, let it be assumed that member 10 is vibrating axially in the direction of double arrow 28. Another pair of weights, such as weights 20c, 20c are adjusted along springs 18c, 18 to vibrate at this frequency and damp the axial vibration. Finally, let it be assumed that member 10 is vibrating angularly as indicated by double arrow 30. Weights 20d, 20d are similarly adjusted along springs 18d, 18d to vibrate at the frequency of the angular or torsional vibration.

As understood in the art, the position of the dampers along member 10 is preferably at points of maximum amplitude of vibration, that is, midway between nodes. Thus, if member 10 is vibrating laterally at only a fundamental frequency, the damper would be positioned midway between supports. If, however, harmonic frequencies are present, two or more dampers may be attached to member 10 between nodes, preferably at points of maximum amplitude of lateral vibration. In the rare event that the optimum positions chosen for lateral vibration should coincide with the nodes of axial and torsional vibration, they may be positioned away from such nodes and still be effective for damping all three of the types of vibration referred to.

Obviously many modifications and variations of the present invention are possible in the light of the above teachings. It is therefore to be understood that within the scope of the appended claims the invention may be practiced otherwise than as specifically described.

What is claimed is:

1. Apparatus for damping vibrations of an elongated member, such as a rod or pipe, comprising:
    (a) a central support adapted to be secured to the elongated member at a desired axial position therealong,
    (b) a plurality of pairs of diametrically opposed radially outwardly extending resilient members disposed in angular relation and in substantially the same plane perpendicular to the axis of the elongated member, and
    (c) a weight secured to each resilient member for radial adjustment therealong, whereby each pair of resilient members and their attached weights may be tuned ot vibrate at a desired frequency of vibration of the elongated member.

2. Apparatus in accordance with claim 1 comprising,
    (d) at least three pairs of resilient members and their attached weights, (e) one pair adapted to damp lateral vibration of the elongated member in one direction,
(f) another pair adapted to damp axial vibration of the elongated member, and
(g) another pair adapted to damp torsional vibration of the elongated member.

3. Apparatus in accordance with claim 3 including
(h) two pairs of resilient members and their attached weights adapted to damp lateral vibration of the elongated member in different directions.

4. Apparatus in accordance with claim 1 wherein
(i) said central support comprises a two-part diametrically split hub, and
(j) means for securing the two-part hub to the elongated member.

5. Apparatus in accordance with claim 4 wherein
(k) said means for securing the two-part hub to the elongated shaft comprises at least one contractible clamp extending circumferentially around the hub.

6. Apparatus in accordance with claim 1 wherein
(l) each of said resilient members comprises a rod threadedly engaging the central support and replaceable by other similar rods of various lengths and adapted to adjustably receive various weights, whereby large variations in the tuned frequencies may be effected.

References Cited by the Examiner
UNITED STATES PATENTS

| | | | |
|---|---|---|---|
| 1,885,504 | 11/1932 | Austin | 174—42 |
| 3,048,649 | 8/1962 | McGavern | 174—42 |
| 3,073,887 | 1/1963 | McGavern | 174—42 |
| 3,128,330 | 4/1964 | Grasser | 174—42 |

CLAUDE A. LE ROY, *Primary Examiner.*

FRANK DOMOTOR, *Assistant Examiner.*